US008868079B2

(12) United States Patent
Morimoto et al.

(10) Patent No.: US 8,868,079 B2
(45) Date of Patent: Oct. 21, 2014

(54) RADIO COMMUNICATION SYSTEM, RADIO BASE STATION, AND COMMUNICATION CONTROL METHOD

(75) Inventors: Akihito Morimoto, Tokyo (JP); Nobuhiko Miki, Tokyo (JP); Masashige Shirakabe, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1 day.

(21) Appl. No.: 13/988,950

(22) PCT Filed: Jul. 18, 2012

(86) PCT No.: PCT/JP2012/068183
§ 371 (c)(1),
(2), (4) Date: May 22, 2013

(87) PCT Pub. No.: WO2013/011998
PCT Pub. Date: Jan. 24, 2013

(65) Prior Publication Data
US 2013/0252612 A1 Sep. 26, 2013

(30) Foreign Application Priority Data

Jul. 21, 2011 (JP) ................. 2011-159774

(51) Int. Cl.
*H04W 36/00* (2009.01)
*H04W 48/20* (2009.01)
*H04W 28/08* (2009.01)
*H04W 36/30* (2009.01)
H04W 84/04 (2009.01)

(52) U.S. Cl.
CPC ............ *H04W 36/30* (2013.01); *H04W 84/045* (2013.01); *H04W 48/20* (2013.01); *H04W 28/08* (2013.01)
USPC ........... 455/436; 455/437; 455/438; 455/439; 455/434

(58) Field of Classification Search
CPC ..... H04W 24/00; H04W 28/08; H04W 36/30; H04W 48/20; H04W 84/045
USPC .......................... 455/436, 437, 438, 439, 434
See application file for complete search history.

(56) References Cited

U.S. PATENT DOCUMENTS

2005/0130662 A1  6/2005  Murai
2011/0151867 A1*  6/2011  Hirano et al. ................. 455/434
2013/0223258 A1*  8/2013  Seo et al. ...................... 370/252

FOREIGN PATENT DOCUMENTS

JP    2007-514367 A    5/2007
JP    2010-114698 A    5/2010

OTHER PUBLICATIONS

International Search Report issued in PCT/JP2012/068183 mailed on Sep. 18, 2012 (2 pages).

*Primary Examiner* — Barry Taylor
(74) *Attorney, Agent, or Firm* — Osha Liang LLP

(57) ABSTRACT

A radio communication system includes a first radio base station that forms a first cell; a plurality of second radio base stations each of which forms a second cell; and a mobile station provided with a radio communication unit that connects, by radio, to each radio base station. The first radio base station specifies a correction value according to the number of the second cells formed in the first cell of the first radio base station and signals the correction value to the mobile station. The mobile station corrects a characteristic value indicating the reception characteristic of radio waves from the second radio base station by using the correction value. Either the first radio base station or the mobile station selects the destination of the mobile station according to the characteristic value of the first radio base station and the corrected characteristic value of the second radio base station.

5 Claims, 6 Drawing Sheets (A) WITHOUT CORRECTION (B) WITH CORRECTION

RADIO COMMUNICATION SYSTEM, RADIO BASE STATION, AND COMMUNICATION CONTROL METHOD

CROSS-REFERENCE TO RELATED APPLICATIONS

This application is a National Stage application of International Patent Application No. PCT/JP2012/068183, filed on Jul. 18, 2012, which claims priority pursuant to 35 U.S.C. §119(a) to Japanese Patent Application No. 2011-159774, filed on Jul. 21, 2011. Both Japanese Patent Application No. 2011-159774 and International Patent Application No. PCT/JP2012/068183 are hereby incorporated by reference in their entirety.

TECHNICAL FIELD

The present invention relates to radio communication systems, radio base stations, and communication control methods.

BACKGROUND ART

In these years, heterogeneous networks (HetNets) have been proposed, in which a plurality of types of radio base stations having different transmission powers (transmission capabilities), such as a macro base station, a pico base station, a femto base station, and a remote radio head, are installed in a multi-layered manner. In heterogeneous networks, a base station having a high transmission power (for example, a macro base station) tends to be selected as the radio destination of a user equipment in a cell searching stage or a handover stage compared with a base station having a low transmission power (for example, a pico base station). Therefore, connections from user equipments tend to concentrate on a base station having a high transmission power, causing excessive communication load.

CITATION LIST

Patent Document

Patent Document 1: Japanese Patent Application Laid-Open Publication No. 2007-514367

SUMMARY OF INVENTION

Technical Problem

Patent Document 1 discloses a technology that controls a communication cell boundary in a variable manner according to parameters, such as the load and traffic of a radio communication system. For example, the communication cell boundary of a micro-cell base station is contracted according to a deterioration in the quality of service provided for a user equipment connected to a macro-cell base station or an increase in interference power imposed by the micro-cell base station on the user equipment connected to the macro-cell base station.

When the communication cell boundary is controlled according to parameters, such as the load and traffic of a radio communication system, however, the specified communication cell boundary may be inappropriate depending on the number of cells of base stations having low transmission power, overlaid on the cell of a base station having high transmission power, and connection concentration of user equipments cannot be appropriately prevented.

In view of this situation, an object of the present invention is to reduce the concentration of connections from user equipments at a specific radio base station to allow the radio resources to be used fairly and efficiently in a radio communication system having a plurality of types of radio base stations having different transmission powers (transmission capabilities).

Solution to Problem

A radio communication system according to the present invention includes a first radio base station that foams a first cell; a plurality of second radio base stations each of which forms, in the first cell, a second cell having a smaller area than the first cell; and a mobile station that includes a radio communication unit that connects, by radio, to each of the first radio base station and the second radio base station that correspond to cells among the first cell and the second cells in which the mobile station is located, and a characteristic-value measuring section that measures a first characteristic value indicating a reception characteristic of radio waves received from the first radio base station and a second characteristic value indicating a reception characteristic of radio waves received from the second radio base station. The first radio base station includes a correction-value specifying section that specifies, according to a number of the second cells formed in the first cell of the first radio base station, a correction value used to correct the second characteristic value, and a correction-value signaling section that signals the correction value specified by the correction-value specifying section to the mobile station. The mobile station includes a characteristic-value correcting section that corrects the second characteristic value measured by the characteristic-value measuring section, by using the correction value signaled from the correction-value signaling section of the first radio base station. Either the first radio base station or the mobile station selects either the first radio base station or the second radio base station corresponding to a characteristic value indicating the best reception characteristic between the first characteristic value and the corrected second characteristic value, as a radio destination of the mobile station.

According to the configuration described above, since the destination of the mobile station is selected according to the corrected characteristic value obtained by correcting, with the correction value according to the number of the second cells, the characteristic value indicating the reception characteristic of radio waves received from the second radio base station, the area of the second cell is expanded and the number of mobile stations connected to the second radio base station is increased, compared with a case in which such a correction is not made (that is, a case in which the destination is selected simply according to the reception characteristic of radio waves from each base station). Therefore, connection concentration from mobile stations at the first radio base station is reduced, and the radio resources are used more fairly and efficiently.

The correction-value specifying section of the first radio base station specifies the correction value such that, the smaller the number of the second cells formed in the first cell of the first radio base station is, the better the reception characteristic of radio waves received by the mobile station from the second radio base station, indicated in the second characteristic value, is.

According to the configuration described above, the correction value is specified such that the reception characteristic becomes better when the number of the second cells formed in the first cell is smaller, which expands the area of each of the second cells formed in the first cell. Therefore, even when a small number of second cells exist in the first cell, the total area of the second cells in the first cell is maintained, which means that the number of mobile terminals connected to the second cells is also maintained. Therefore, the connections from mobile terminals are prevented from concentrating at the first radio base station.

The characteristic value indicating the reception characteristic of radio waves may be either a characteristic value that is larger when the reception characteristic is better (such as the received power) or a characteristic value that is smaller when the reception characteristic is better. Therefore, "specifying the correction value such that the reception characteristic becomes better" can mean specifying the correction value such that the characteristic value becomes larger when employing the characteristic value that is larger when the reception characteristic is better; and specifying the correction value such that the characteristic value becomes smaller when employing the characteristic value that is smaller when the reception characteristic is better.

A radio base station according to the present invention is a first radio base station and that is used in a radio communication system that includes the first radio base station that forms a first cell; a plurality of second radio base stations each of which forms, in the first cell, a second cell having a smaller area than the first cell; and a mobile station that includes a radio communication unit that connects, by radio, to each of the first radio base station and the second radio base station that correspond to cells among the first cell and the second cells in which the mobile station is located and a characteristic-value measuring section that measures a first characteristic value indicating a reception characteristic of radio waves received from the first radio base station and a second characteristic value indicating a reception characteristic of radio waves received from the second radio base station. The radio base station includes a correction-value specifying section that specifies, according to a number of the second cells formed in the first cell of the first radio base station, a correction value used to correct the second characteristic value, to be compared with the first characteristic value in order to select a radio base station serving as a radio destination of the mobile station, and a correction-value signaling section that signals the correction value specified by the correction-value specifying section to the mobile station.

It is preferable that the radio base station select either the first radio base station or the second radio base station corresponding to a characteristic value indicating the best reception characteristic between the first characteristic value and the corrected second characteristic value, as a radio destination of the mobile station.

A communication control method according to the present invention is for a radio communication system that includes a first radio base station that forms a first cell; a plurality of second radio base stations each of which forms, in the first cell, a second cell having a smaller area than the first cell; and a mobile station including a radio communication unit that connects, by radio, to each of the first radio base station and the second radio base station that correspond to cells among the first cell and the second cells in which the mobile station is located and a characteristic-value measuring section that measures a first characteristic value indicating a reception characteristic of radio waves received from the first radio base station and a second characteristic value indicating a reception characteristic of radio waves received from the second radio base station. The communication control method includes specifying a correction value used to correct the second characteristic value, according to a number of the second cells formed in the first cell of the first radio base station, and signaling the correction value specified by the correction-value specifying section to the mobile station, in the first radio base station; correcting the second characteristic value measured by the characteristic-value measuring section, by using the correction value signaled from the first radio base station, in the mobile station; and selecting either the first radio base station or the second radio base station corresponding to a characteristic value indicating the best reception characteristic between the first characteristic value and the corrected second characteristic value, in either the first radio base station or the mobile station.

DESCRIPTION OF EMBODIMENTS

Embodiment

Figure 1:
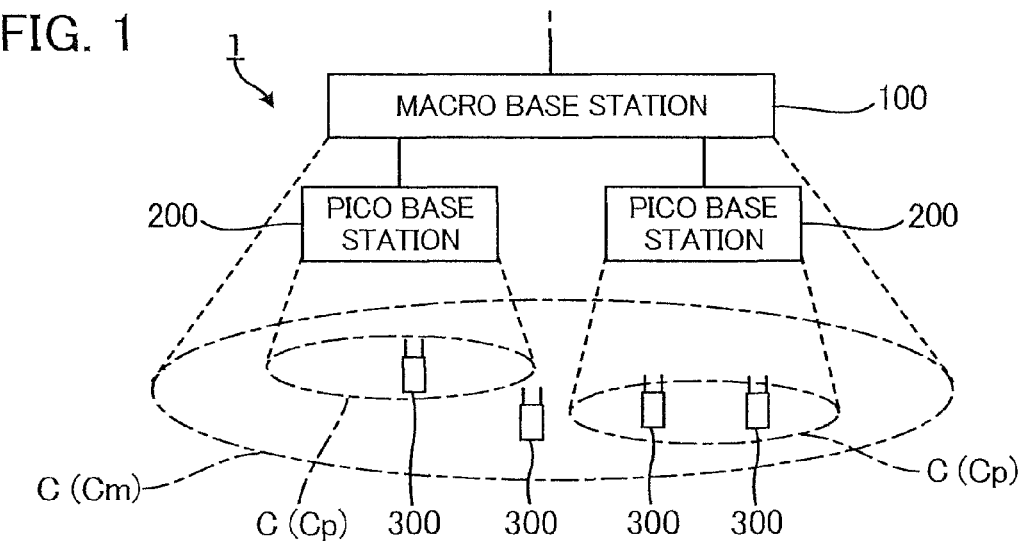
FIG. 1 is a block diagram showing a radio communication system according to an embodiment of the present invention.

FIG. 1 is a block diagram showing a radio communication system 1 according to an embodiment of the present invention. The radio communication system 1 includes a macro base station (macro evolved node B (eNodeB)) 100, pico base stations (pico eNodeB) 200, and user equipments 300. Each of the communication elements (such as the macro base station 100, the pico base stations 200, and the user equipments 300) in the radio communication system 1 performs radio communication according to a predetermined radio access technology, such as long term evolution (LTE). In the present embodiment, an example case will be described in which the radio communication system 1 operates according to LTE, but there is no intention to limit the technical scope of the present invention. The present invention can also be applied to other radio access technologies after necessary design changes are made.

The macro base station 100 and the pico base stations 200 are connected to each other by wire or by radio. The macro base station 100 forms a macro cell Cm, and the pico base stations 200 form pico cells Cp. The pico cells Cp are formed in the macro cell Cm formed by the macro cell 100 to which the pico base stations 200 that form the pico cells Cp are connected.

Each of the base stations (the macro base station 100 and the pico base stations 200) can communicate by radio with a user equipment (UE) 300 located in the cell of that base station. Conversely, a user equipment 300 can communicate by radio with the base station (macro base station 100 or pico base station 200) corresponding to the cell C (macro cell Cm or pico cell Cp) in which that user equipment 300 is located.

Since the macro base station 100 has a higher radio transmission capability (maximum transmission power, average transmission power, and others) than the pico base stations 200, the macro base station 100 can communicate by radio with user equipments 300 located farther. Therefore, the macro cell Cm is larger in area than the pico cells Cp. For example, the macro cell Cm has a radius of about several hundred meters to several tens of kilometers, whereas the pico cells Cp have a radius of about several meters to several tens of meters.

As understood from the foregoing description, the macro base station 100 and the pico base stations 200 in the radio communication system 1 form a heterogeneous network (HetNet), in which a plurality of types of radio base stations having different transmission powers (transmission capabilities) are installed in a multi-layer manner (see 3rd Generation Partnership Project; Technical Specification Group Radio Access Network; Evolved Universal Terrestrial Radio Access (E-UTRA); Further advancements for E-UTRA physical layer aspects (Release 9); 3GPP TR 36.814 V9.0.0 (2010-03); Section 9A, Heterogeneous Deployments).

Since the pico cells Cp are formed inside the macro cell Cm in a multi-layer manner (are overlaid on), when a user equipment 300 is located in a pico cell Cp, it can be understood that the user equipment 300 can communicate by radio with both the pico base station 200 forming that pico cell Cp and the macro base station 100 forming the macro cell that includes the pico cell Cp.

Any radio communication method can be used between each base station and a user equipment 300. For example, orthogonal frequency division multiple access (OFDMA) may be employed for downlink, and single-carrier frequency division multiple access (SC-FDMA) may be employed for uplink.

Figure 2:
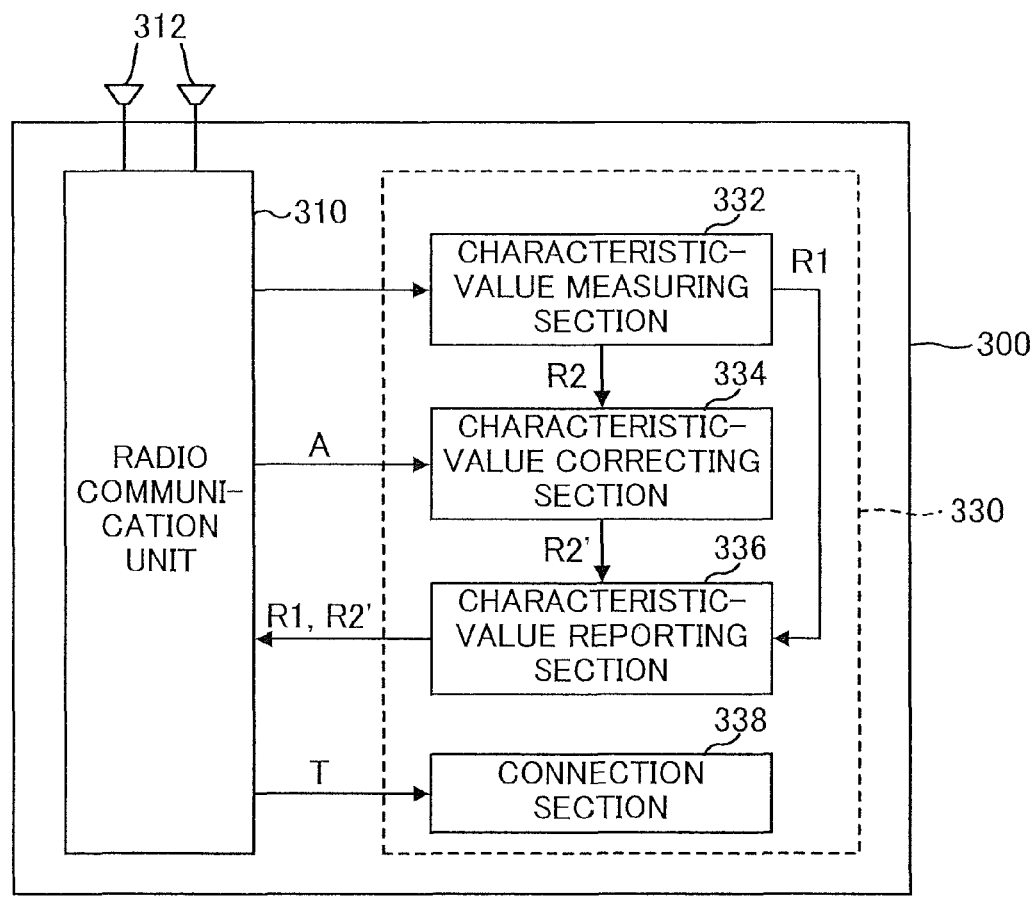
FIG. 2 is a block diagram showing the configuration of a user equipment according to the embodiment of the present invention.

FIG. 2 is a block diagram showing the configuration of the user equipment 300 according to the embodiment of the present invention. The user equipment 300 includes a radio communication unit 310 and a controller 330. For convenience, an output unit for outputting sound or video, an input unit for accepting support from the user, and other units are omitted in the figure.

The radio communication unit 310 executes radio communication with a base station (macro base station 100 and pico base station 200). The radio communication unit 310 includes transmission and receiving antennas 312, a receiving circuit for receiving radio waves from a base station and converting them to an electrical signal, and a transmission circuit for converting an electrical signal, such as a voice signal, to radio waves and sending them. The radio communication unit 310 also receives a correction value A and destination cell information T from the macro base station 100 forming the macro cell Cm in which the user equipment 300 is located, and sends characteristic values R to the macro base station 100 (details will be described later).

The controller 330 includes a characteristic-value measuring section 332, a characteristic-value correcting section 334, a characteristic-value reporting section 336, and a connection section 338. The controller 330, and the characteristic-value measuring section 332, the characteristic-value correcting section 334, the characteristic-value reporting section 336, and the connection section 338 included in the controller 330, are functional blocks implemented when a central processing unit (CPU), not shown, included in the user equipment 300 executes a computer program stored in a storage, not shown, and functions according to the computer program. The detailed operation of the controller 330 will be described later.

Figure 3:
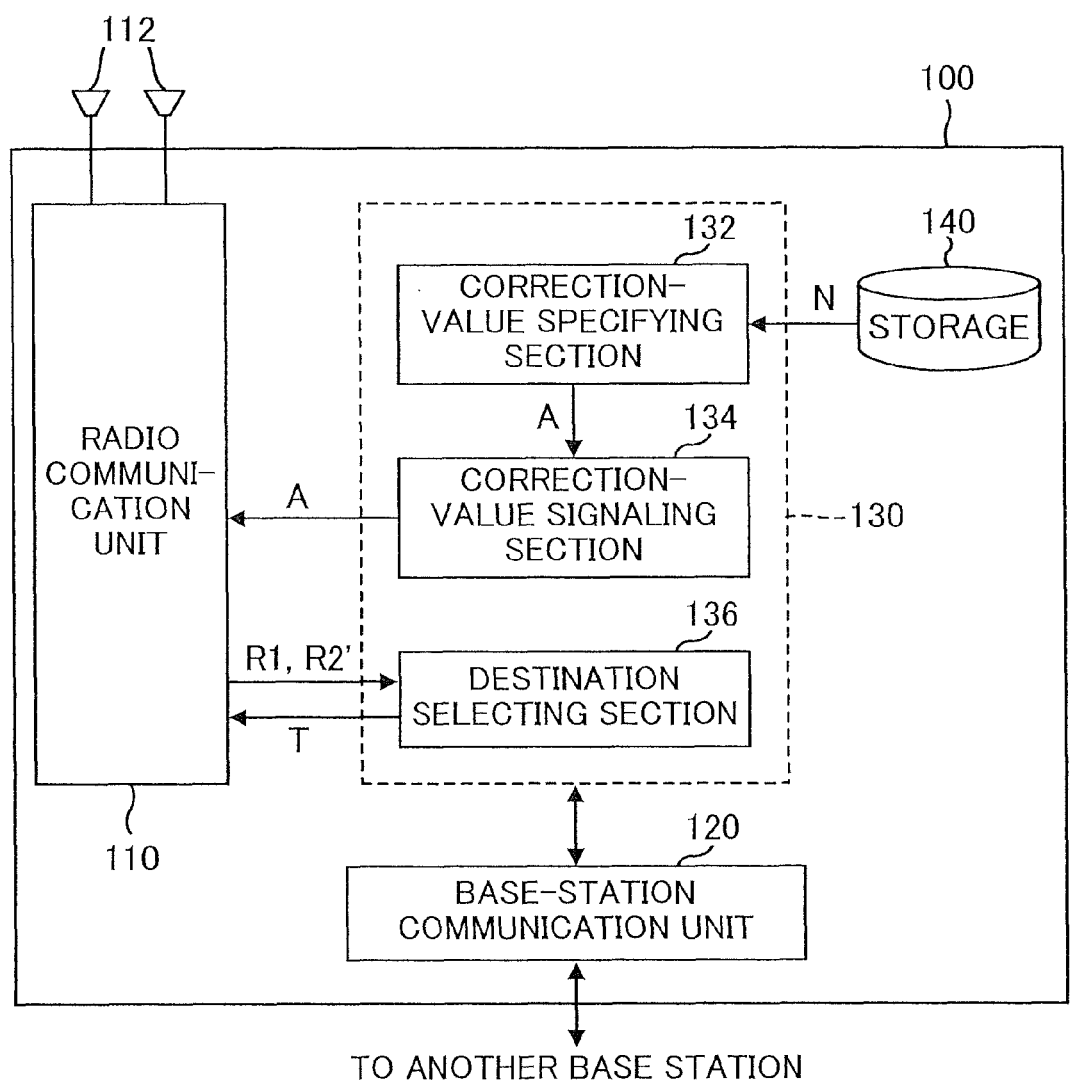
FIG. 3 is a block diagram showing the configuration of a macro base station according to the embodiment of the present invention.

FIG. 3 is a block diagram showing the configuration of the macro base station 100 according to the embodiment of the present invention. The macro base station 100 includes a radio communication unit 110, a base-station communication unit 120, a controller 130, and a storage 140.

The radio communication unit 110 executes radio communication with a user equipment 300. The radio communication unit 110 includes transmission and receiving antennas 112, a receiving circuit for receiving radio waves from the user equipment 300 and converting them to an electrical signal, and a transmission circuit for converting an electrical signal, such as a voice signal, to radio waves and sending them. The radio communication unit 110 also sends the correction value A and the destination cell information T to the user equipment 300 located in the macro cell of the macro base station 100 and receives the characteristic values R from the user equipment 300 (details will be described later).

The base-station communication unit 120 executes communication with another base station (macro base station 100 or pico base station 200) and sends and receives an electrical signal to and from the other base station. When the macro base station 100 communicates with another base station by radio, it is understood as a matter of course that the radio communication unit 110 can also operate as the base-station communication unit 120.

The controller 130 includes a correction-value specifying section 132, a correction-value signaling section 134, and a destination selecting section 136. The controller 130, and the correction-value specifying section 132, the correction-value signaling section 134, and the destination selecting section 136 included in the controller 130, are functional blocks implemented when a CPU, not shown, included in the macro base station 100 executes a computer program stored in the storage 140 and functions according to the computer program. The detailed operation of the controller 130 will be described later.

The storage 140 is a storage medium for storing the above-described computer program and various pieces of information required for transmission control of the present invention. The storage 140 may be formed of a random access memory (RAM), for example. In particular, the number, N, of pico cells Cp formed in the macro cell Cm formed by the macro base station 100 is stored in the storage 140.

Figure 4:
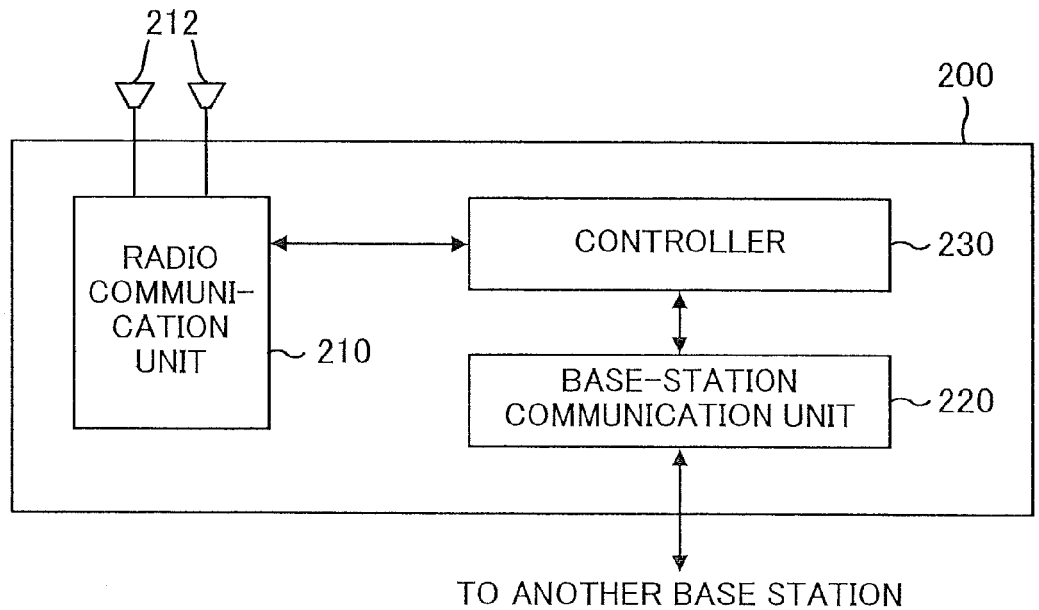
FIG. 4 is a block diagram showing the configuration of a pico base station according to the embodiment of the present invention.

FIG. 4 is a block diagram showing the configuration of the pico base station 200 according to the embodiment of the present invention. The pico base station 200 includes a radio communication unit 210, a base-station communication unit 220, and a controller 230.

The radio communication unit 210 executes radio communication with a user equipment 300. The radio communication unit 210 includes transmission and receiving antennas 212, a receiving circuit for receiving radio waves from the user equipment 300 and converting them to an electrical signal, and a transmission circuit for converting an electrical signal, such as a voice signal, to radio waves and sending them.

The base-station communication unit 220 executes communication with the macro base station 100 to which the pico base station 200 is connected and sends and receives an electrical signal to and from the macro base station 100. When the pico base station 200 communicates with the macro base station 100 by radio, the radio communication unit 210 may also operate as the base-station communication unit 220.

The pico base station 200 can receive information (correction value A, destination cell information T, or others) sent from the macro base station 100 and forward the information to the user equipment 300, and can receive information (characteristic values R or others) sent from the user equipment 300 and forward the information to the macro base station 100. More specifically, the controller 230 supplies, to the radio communication unit 210, the electrical signal indicating the correction value A, the destination cell information T, etc., which the base-station communication unit 220 of the pico base station 200 receives from the macro base station 100. The radio communication unit 210 converts the supplied electrical signal to radio waves and sends them to the user equipment 300. The controller 230 also supplies, to the base-station communication unit 220, the electrical signal indicating the characteristic values R etc. obtained through receiving and conversion by the radio communication unit 210 of the pico base station 200. The base-station communication unit 220 sends the supplied electrical signal to the macro base station 100. With the above-described configuration, even if it is difficult for the user equipment 300 to communicate with the macro base station 100 by radio because the user equipment 300 is close to the pico base station 200, necessary information can be exchanged between the user equipment 300 and the macro base station 100.

The controller 230 of the pico base station 200 is a functional block implemented when a CPU, not shown, included in the pico base station 200 executes a computer program stored in a storage, not shown, and functions according to the computer program.

Figure 5:
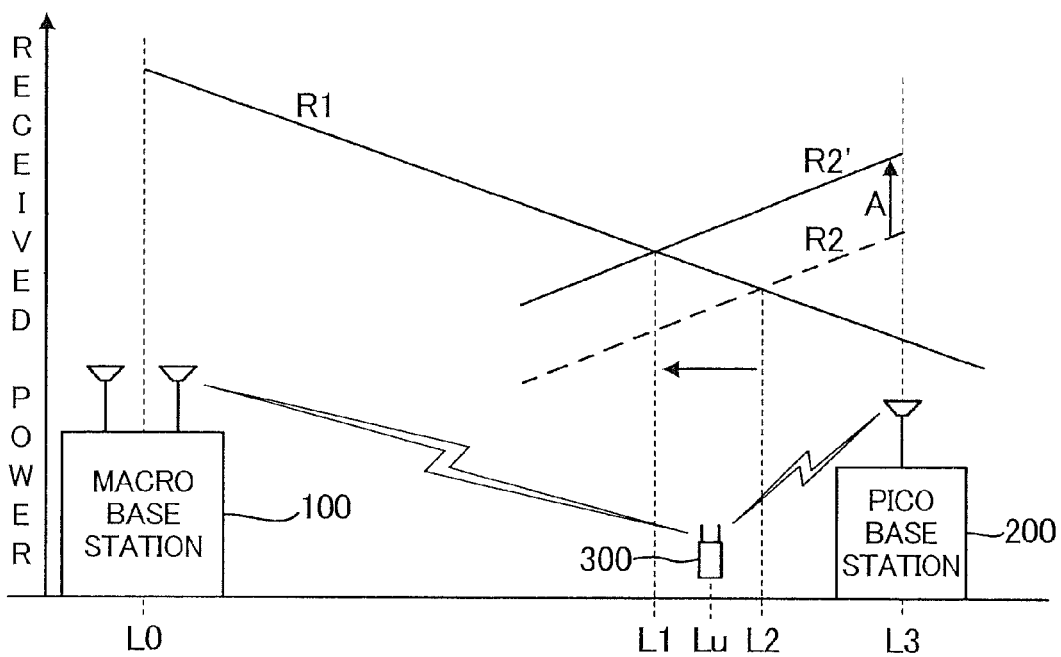
FIG. 5 is a view explaining how to correct a reception characteristic (received power) according to the embodiment of the present invention.

Details of how a reception characteristic (received power) is corrected according to the embodiment of the present invention will be described with reference to FIG. 5. As shown in FIG. 5, the user equipment 300 receives radio waves from each of the macro base station 100 and the pico base station 200. The characteristic-value measuring section 332 of the user equipment 300 measures the received powers (reference-signal received power, RSRP) of the radio waves received from the macro base station 100 and the pico base station 200 to obtain a characteristic value R1 indicating the received power from the macro base station 100 and a characteristic value R2 indicating the received power from the pico base station 200. As shown in the figure, the farther the user equipment 300 is from each base station, the lower the received power (characteristic value R1, characteristic value R2) is.

For the sake of explanation, it is assumed in the following description that the macro base station 100 is disposed at a position L0, the pico base station 200 is disposed at a position L3, and the characteristic value R1 indicating the received power from the macro base station 100 is equal to the characteristic value R2 indicating the received power from the pico base station 200 at a position L2. It is also assumed that the user equipment 300 is disposed at a position Lu closer to the macro base station 100 than the position L2 is.

As shown in FIG. 5, at the position Lu, the characteristic value R1 obtained when the user equipment 300 measured the received power of radio waves from the macro base station 100 is larger than the characteristic value R2 obtained when the user equipment 300 measured the received power of radio waves from the pico base station 200. Therefore, based on a technology in which the user equipment 300 simply connects to a base station that transmits radio waves having a higher received power, the user equipment 300 or a network-side apparatus, such as a base station, would determine that the user equipment 300 disposed at the position Lu should connect to the macro base station 100 by radio.

When the number, N, of pico cells Cp formed in the macro cell Cm is small, however, if the destinations of user equipments 300 are simply determined according to the received power, since it is determined that a small number of user equipments 300 should be connected to the pico base stations 200 corresponding to the pico cells Cp, and conversely, it is determined that a large number of user equipments 300 should be connected to the macro base stations 100, the connections from user equipments 300 would concentrate on the macro base station 100.

Figure 6:
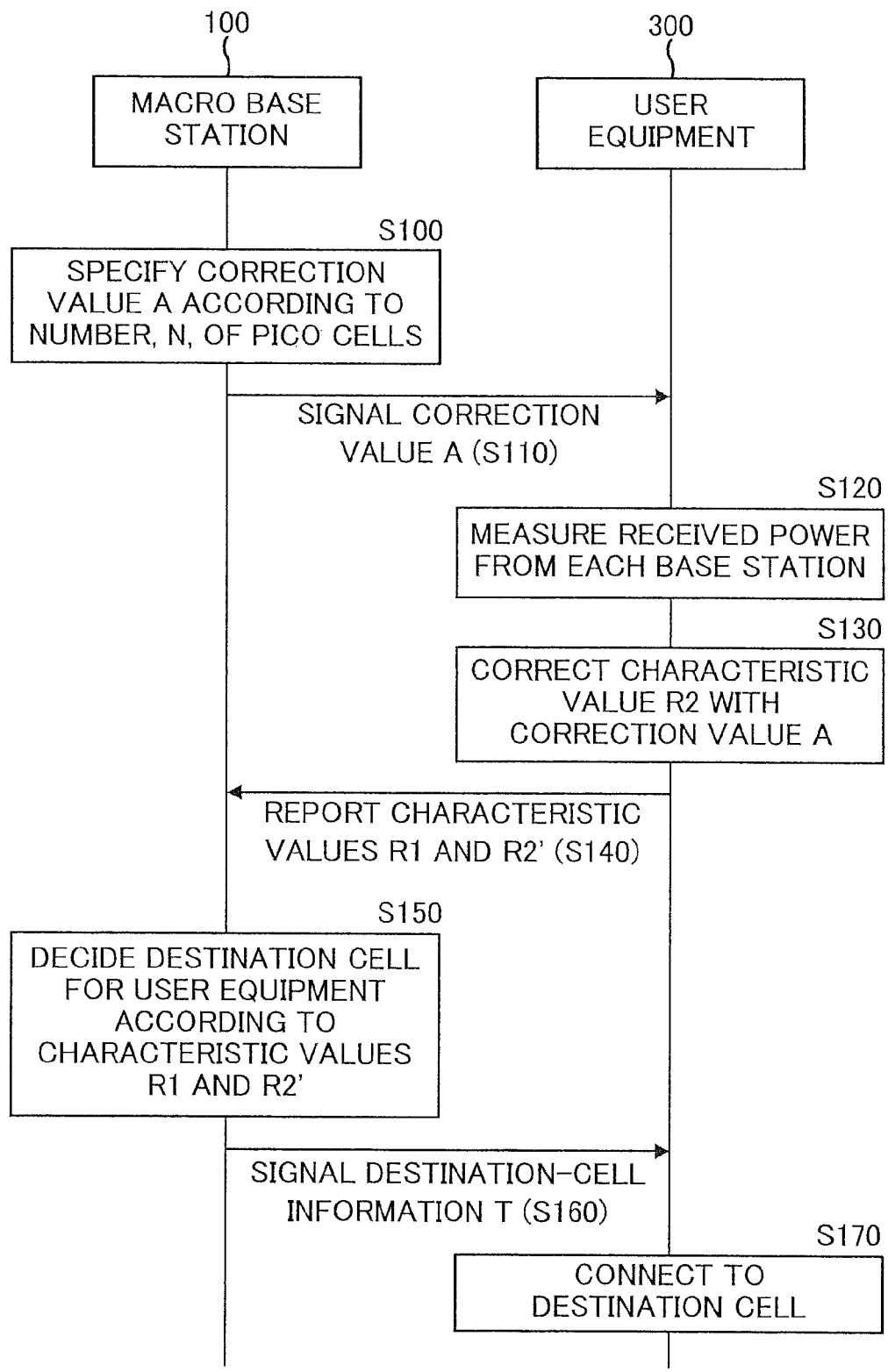
FIG. 6 is a sequence diagram of how the reception characteristic is corrected in the radio communication system.

Taking the above-described situation into account, the characteristic value R2 indicating the received power (reception characteristic) from the pico base station 200 is corrected (that is, the area of each pico cell Cp is enlarged) according to the number, N, of pico cells Cp formed in the macro cell Cm in the present embodiment. By doing so, more user equipments 300 are connected to pico base stations 200 to reduce the concentration of connections to the macro base station 100. The specific operation will be described below also with reference to FIG. 6.

The correction-value specifying section 132 of the macro base station 100 specifies a correction value A according to the number, N, of pico cells Cp foamed in the macro cell Cm of the macro base station 100, which is stored in the storage 140 (step S100). The correction-value signaling section 134 signals the specified correction value A to the user equipment 300 through the radio communication unit 110 (step S110). The correction value A is used for a correction in which the characteristic value R2 is increased, the value R2 indicating the received power (reception characteristic) of radio waves received by the user equipment 300 from the pico base station 200. The smaller the number, N, of pico cells Cp formed in the macro cell Cm, the larger the correction value A (value that causes the received power of radio waves from the pico cell Cp to be recognized as being larger).

As described above, the characteristic-value measuring section 332 of the user equipment 300 measures the received power of radio waves sent from each base station (the macro base station 100 and the pico station 200) and received by the radio communication unit 310 and acquires the characteristic value R1 and the characteristic value R2 (step S120).

Then, the characteristic-value correction section 334 of the user equipment 300 corrects the received power (characteristic value R2) of radio waves from the pico base station 200 with the correction value A. More specifically, the characteristic-value correction section 334 adds the correction value A to the characteristic value R2 acquired when the received power of the radio waves received from the pico base station 200 is measured, to obtain a corrected characteristic value R2' (R2'=R2+A) (step S130). That is, as shown in FIG. 5, regarding the pico base station 200, the characteristic value R2 of the user equipment 300 is offset with the correction value A to become the corrected characteristic value R2'.

It is assumed here that the characteristic value R1 corresponding to the macro base station 100 is equal to the corrected characteristic value R2' corresponding to the pico base station 200 at a position L1 (see FIG. 5). It is also assumed that the user equipment 300 is located at the position Lu, which is between the position L1 and the position L2 (position where the characteristic value R1 is equal to the characteristic value R2, which is not corrected). At the position Lu, the actual received power (characteristic value R1) from the macro base station 100 is higher than the actual received power (characteristic value R2) from the pico base station 200 (R1>R2), but the corrected characteristic value R2' corresponding to the pico base station 200 is higher than the characteristic value R1 corresponding to the macro base station 100 (R1<R2'(=R2+A)).

The characteristic value R1 from the characteristic-value measuring section 332 and the corrected characteristic value R2' from the characteristic-value correcting section 334 are sent to the characteristic-value reporting section 336. The characteristic-value reporting section 336 reports (sends) the characteristic values R (R1 and R2') to the macro base station 100 through the radio communication unit 310 (step S140).

The destination selecting section 136 of the macro base station 100 selects, as the radio destination of the user equipment 300, a base station providing the highest received power, that is, a base station corresponding to the characteristic value R indicating the best reception characteristic among the characteristic values R (R1 and R2') reported from the characteristic-value reporting section 336 of the user equipment 300 (step S150).

As described above, in the present embodiment, since the user equipment 300 is located at the position Lu, the characteristic value R2' indicates the highest received power (R2'>R1). Therefore, the destination selecting section 136 of the macro base station 100 selects the pico base station 200 (pico cell Cp) corresponding to the characteristic value R2' as the radio destination of the user equipment 300.

The destination selecting section 136 signals destination-cell information T indicating the selected radio destination to the user equipment 300 through the radio communication unit 110 (step S160).

In step S170, the connection section 338 of the user equipment 300 executes a connection operation for the destination cell indicated by the destination-cell information T received from the macro base station 100 (or continues the connection if the user equipment 300 has already been connected to the destination cell indicated by the destination-cell information T). For example, when the user equipment 300 is connected to the macro cell Cm, if the connection section 338 receives destination-cell information T specifying the pico cell Cp as the destination, the connection section 338 connects (off-loads) the user equipment 300 to the specified pico cell Cp.

As understood from the foregoing description, in particular, from the descriptions of step S130 and step 5150, the correction of the characteristic value R2 (the increase with the correction value A) in the characteristic-value correcting section 334 increases the apparent received power from the pico base station 200 at each user equipment 300 to expand the area of the pico cell Cp formed by the pico base station 200.

Figure 7:
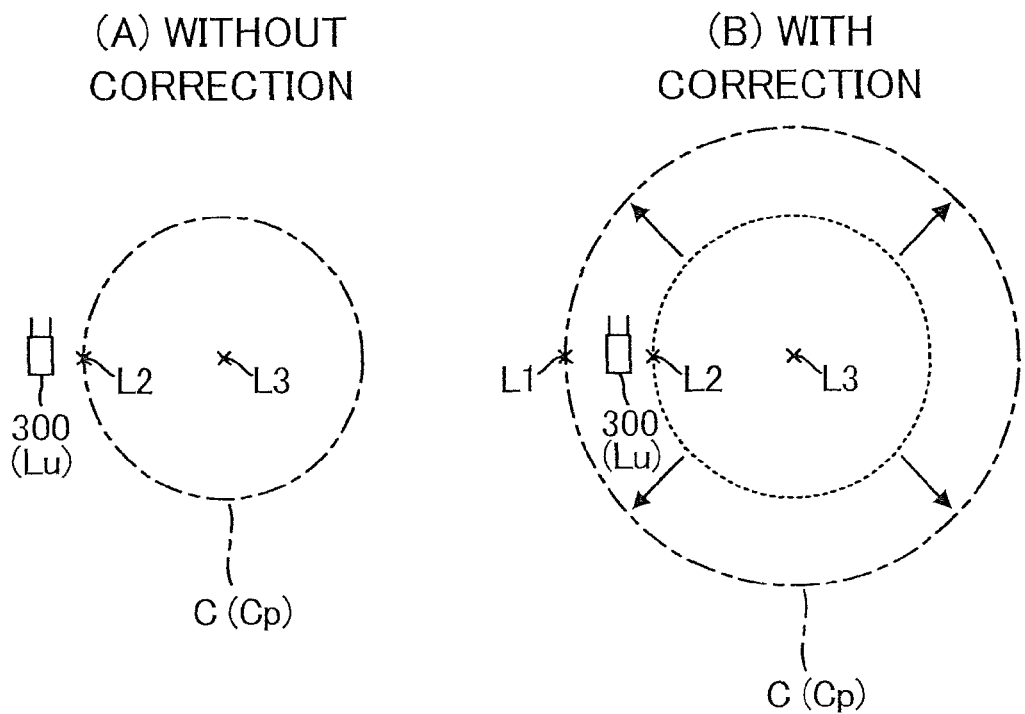
FIG. 7 includes views showing a change in the area of a pico cell according to whether the correction is made or not.

FIG. 7 includes views showing a change in the area of the pico cell Cp, caused by the correction with the correction value A, and corresponds to FIG. 5. Without correction (FIG. 7(A)), since the pico cell Cp formed by a pico base station 200, not shown, disposed at a position L3 has an area in which the characteristic value R2 corresponding to the pico base station 200 exceeds the characteristic value R1 corresponding to the macro base station 100 (area that includes a position L2 as a point on the boundary), the position Lu, in which the user equipment 300 is located (position closer to the macro base station 100 than the position L2 is), is outside the pico cell Cp. In contrast, with the correction (FIG. 7(B)), since the pico cell Cp has an area in which the corrected characteristic value R2' corresponding to the pico base station 200 exceeds the characteristic value R1 corresponding to the macro base station 100 (area that includes a position L1 as a point on the boundary), the position Lu, in which the user equipment 300 is located (position closer to the pico base station 200 than the position L1 is), is inside the pico cell Cp. As described above, the correction with the correction value A expands the area of the pico cell Cp.

Figure 8:
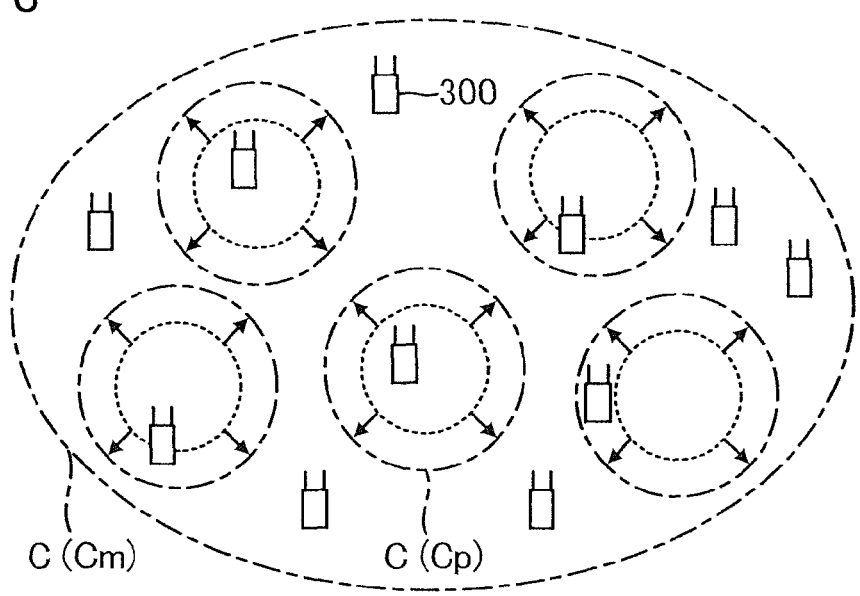
FIG. 8 is a view showing the areas of pico cells when the number of pico cells in a macro cell is five.
Figure 9:
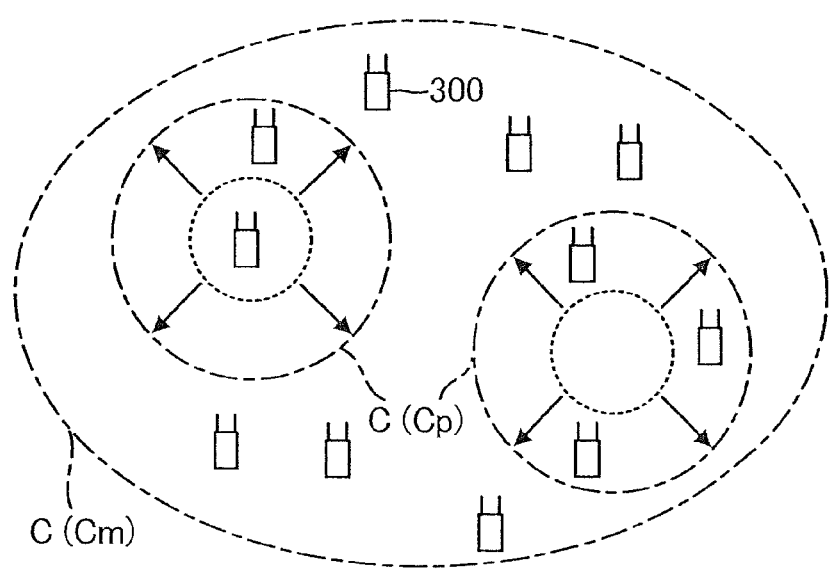
FIG. 9 is a view showing the areas of pico cells when the number of pico cells in a macro cell is two.

FIG. 8 and FIG. 9 are views showing changes in the area of each pico cell Cp according to the number, N, of pico cells Cp formed in the macro cell Cm. In FIG. 8, five pico cells Cp are formed in the macro cell Cm, whereas, in FIG. 9, two pico cells Cp are formed in the macro cell Cm. As described above, the smaller the number, N, of pico cells Cp in the macro cell Cm, the larger the correction value A. Therefore, the smaller the number, N, of pico cells Cp in the macro cell Cm, the larger the area of each pico cell Cp. In other words, the correction value A is larger and the area of each pico cell Cp is larger in the case of FIG. 9 in which the number of pico cells Cp is two than in the case of FIG. 8 in which the number of pico cells Cp is five.

According to the above-described embodiment, since the destination of each user equipment 300 is selected according to the corrected characteristic value R2' obtained by correcting, with the correction value A, the characteristic value R2 indicating the received power of radio waves received from the pico base station 200, the area of the pico cell Cp is expanded and the number of user equipments 300 connected (off-loaded) to the pico base stations 200 is increased, compared with a case in which such a correction is not made (that is, a case in which the destination is selected simply according to the received power of radio waves from each base station). Therefore, connection concentration at the macro base station is reduced, and the radio resources are used more fairly and efficiently.

In addition, the smaller the number, N, of pico cells Cp in the macro cell Cm, the larger the correction value A, which expands the area of each pico cell Cp in the macro cell Cm. Therefore, even when a small number of pico cells Cp exist, the total area of the pico cells Cp in the macro cell Cm is maintained, which means that the number of user equipments 300 connected to the pico base stations 200 is also maintained. Therefore, the connections from user equipments 300 are prevented from concentrating at the macro base station 100.

MODIFICATIONS

The embodiment described above can be modified in various ways. Specific example modifications will be described below. Two or more of the following modifications selected in a desired manner can be appropriately combined so long as no mutual contradiction occurs.

Modification 1

In the above-described embodiment, the reception characteristic of radio waves is the received power (reference signal received power, RSRP). The reception characteristic may be the signal to interference-and-noise ratio (SINR), the reference signal received quality, or the like. When the reception characteristic is expressed as a ratio, such as the SINR, the characteristic value R of the reception characteristic may be multiplied by a correction value A to calculate the corrected characteristic R'(R'=R·A).

When the reception characteristic is expressed in dB (logarithm of a ratio), a correction value expressed in dB may be added to the characteristic value R expressed in dB to calculate the characteristic R'. It is understood as a matter of course that this is one type of cases in which the characteristic R is multiplied by a correction value A.

Modification 2

In the above-described embodiment, when the characteristic values R (such as the received power) are larger, the reception state is better. Another characteristic value R may be used, which indicates a better reception state when it is smaller. For example, the reciprocal of a value indicating the received power may be used as a characteristic value R. In that case, a base station corresponding to a smaller characteristic value R is selected by the destination selecting section 136 as the radio destination of the user equipment 300. The characteristic-value correcting section 334 may subtract a correction value A from the characteristic value R or divide the characteristic value R by a correction value A to calculate the corrected characteristic value R'.

Modification 3

In the above-described embodiment, the pico base stations 200 are used as examples of base stations having a lower transmission capability than the macro base station 100. A micro base station, a nano base station, a femto base station, a remote radio head, or the like may be used as a base station having a lower transmission capability.

In particular, as an element of the radio communication system 1, a combination of a plurality of base stations having different transmission capabilities (for example, a combination of a macro base station, a pico base station, and a femto base station) may be used. In that case, it is preferable that the correction value A be determined independently according to the transmission capability of each base station (for example, a correction value A1 determined for the pico base station be different from a correction value A2 determined for the femto base station).

Modification 4

It is also possible to employ a configuration in which the number, N, of pico cells Cp in the macro cell Cm is dynamically changed. In other words, during the operation of the macro base station 100, a pico base station 200 may be added or removed according to necessity. In that case, it is preferable that the controller 130 of the macro base station 100 detect the number, N, of pico cells Cp in the macro cell Cm formed by the macro base station 100, store the number in the storage 140, and specify the correction value A according to the stored number, N.

Modification 5

The correction value A can freely be specified according to the number, N, of pico cells Cp formed in the macro cell Cm. For example, it is preferable that the correction value A be specified such that the ratio of a standard cell area based on the transmission capability of the macro base station 100 and the total of standard cell areas based on the transmission capabilities of N pico base stations 200 connected to the macro base station is constant. In the foregoing configuration, even when the number, N, of pico cells Cp varies, the ratio of the size (area) of the macro cell Cm and the total of the sizes (areas) of a plurality of pico cells Cp formed in the macro cell Cm approaches a constant value (is constant in the preferable case). Therefore, the number (rate) of user equipments 300 off-loaded to the pico cells Cp is maintained. Consequently, the concentration of connections from user equipments 300 at the macro base station 100 can be avoided more effectively.

Modification 6

In the above-described embodiment, the macro base station 100 (destination selecting section 136) selects the destination of each user equipment 300 according to the characteristic values R (R1 and R2) reported from the user equipment 300. A destination selection section provided in the controller 330 of each user equipment 300 may select the destination according to the characteristic values R (R1 and R2) obtained by the user equipment 300 itself.

Modification 7

The user equipments 300 are devices capable of communicating with each base station (macro base station 100, pico base station 200) by radio. For example, the user equipments 300 may be portable telephone terminals, such as feature phones or smart phones, desktop personal computers, notebook personal computers, ultra-mobile personal computers (UMPC), portable game machines, or other radio terminals.

Modification 8

The functions executed by the CPU in each element (macro base station 100, pico base stations 200, and user equipments 300) in the radio communication system 1 may be executed by hardware instead of the CPU, or may be executed by a programmable logic device, such as a field programmable gate array (FPGA) or a digital signal processor (DSP).

REFERENCE NUMERALS

1: Radio communication system
100: Macro base station
110: Radio communication unit
120: Base-station communication unit
130: Controller
132: Correction-value specifying section
134: Correction-value signaling section
136: Destination selecting section
200: Pico base station
210: Radio communication unit
220: Base-station communication unit
230: Controller
300: User equipment
310: Radio communication unit
330: Controller
332: Characteristic-value measuring section
334: Characteristic-value correcting section
336: Characteristic-value reporting section
338: Connection section
A: Correction value
C (Cm, Cp): Cells
L (L0 to L3, Lu): Positions
N: Count
R (R1, R2): Characteristic values
T: Destination-cell information

The invention claimed is:

1. A radio communication system comprising:
a first radio base station that forms a first cell;
a plurality of second radio base stations each of which forms, in the first cell, a second cell having a smaller area than the first cell; and
a mobile station comprising:
 a radio communication unit that connects, by radio, to each of the first radio base station and the second radio base station that correspond to cells among the first cell and the second cells in which the mobile station is located; and
 a characteristic-value measuring section that measures a first characteristic value indicating a reception characteristic of radio waves received from the first radio base station and a second characteristic value indicating a reception characteristic of radio waves received from the second radio base station;
the first radio base station comprising:
 a correction-value specifying section that specifies, according to a number of the second cells formed in the first cell of the first radio base station, a correction value used to correct the second characteristic value; and a correction-value signaling section that signals the correction value specified by the correction-value specifying section to the mobile station;

the mobile station comprising a characteristic-value correcting section that corrects the second characteristic value measured by the characteristic-value measuring section, by using the correction value signaled from the correction-value signaling section of the first radio base station, wherein either the first radio base station or the mobile station selects either the first radio base station or the second radio base station corresponding to a characteristic value indicating the best reception characteristic between the first characteristic value and the corrected second characteristic value, as a radio destination of the mobile station.

2. The radio communication system according to claim 1, wherein the correction-value specifying section of the first radio base station specifies the correction value such that, the smaller the number of the second cells formed in the first cell of the first radio base station is, the better the reception characteristic of radio waves received by the mobile station from the second radio base station, indicated in the second characteristic value, is.

3. A radio base station that is a first radio base station and that is used in a radio communication system that comprises the first radio base station that forms a first cell;

a plurality of second radio base stations each of which forms, in the first cell, a second cell having a smaller area than the first cell; and a mobile station that comprises
a radio communication unit that connects, by radio, to each of the first radio base station and the second radio base station that correspond to cells among the first cell and the second cells in which the mobile station is located, and a characteristic-value measuring section that measures a first characteristic value indicating a reception characteristic of radio waves received from the first radio base station and a second characteristic value indicating a reception characteristic of radio waves received from the second radio base station;

the radio base station comprising:
a correction-value specifying section that specifies, according to a number of the second cells formed in the first cell of the first radio base station, a correction value used to correct the second characteristic value, to be compared with the first characteristic value in order to select a radio base station serving as a radio destination of the mobile station; and a correction-value signaling section that signals the correction value specified by the correction-value specifying section to the mobile station.

4. The radio base station according to claim 3, wherein either the first radio base station or the second radio base station corresponding to a characteristic value indicating the best reception characteristic between the first characteristic value and the corrected second characteristic value is selected as a radio destination of the mobile station.

5. A communication control method for a radio communication system that comprises:

a first radio base station that forms a first cell;
a plurality of second radio base stations each of which forms, in the first cell, a second cell having a smaller area than the first cell; and a mobile station comprising:
a radio communication unit that connects, by radio, to each of the first radio base station and the second radio base station that correspond to cells among the first cell and the second cells in which the mobile station is located; and a characteristic-value measuring section that measures a first characteristic value indicating a reception characteristic of radio waves received from the first radio base station and a second characteristic value indicating a reception characteristic of radio waves received from the second radio base station, the communication control method comprising:
specifying a correction value used to correct the second characteristic value, according to a number of the second cells formed in the first cell of the first radio base station, and signaling the correction value to the mobile station, in the first radio base station;

correcting the second characteristic value measured by the characteristic-value measuring section, by using the correction value signaled from the first radio base station, in the mobile station; and selecting either the first radio base station or the second radio base station corresponding to a characteristic value indicating the best reception characteristic between the first characteristic value and the corrected second characteristic value, in either the first radio base station or the mobile station.

* * * * *